United States Patent
Tanaka

(10) Patent No.: US 7,177,524 B2
(45) Date of Patent: Feb. 13, 2007

(54) SIGNAL PROCESSING APPARATUS

(75) Inventor: Shuya Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1101 days.

(21) Appl. No.: 10/161,856

(22) Filed: Jun. 4, 2002

(65) Prior Publication Data

US 2003/0138235 A1    Jul. 24, 2003

(30) Foreign Application Priority Data

Jun. 6, 2001  (JP)  ............................ 2001-170963

(51) Int. Cl.
*H04N 5/91* (2006.01)
(52) U.S. Cl. .................... 386/69; 386/124; 386/126
(58) Field of Classification Search .............. 386/69, 386/95, 121, 125, 126

See application file for complete search history.

(56) References Cited

U.S. PATENT DOCUMENTS 5,621,579 A * 4/1997 Yuen .......................... 386/121
5,727,060 A * 3/1998 Young ........................ 348/734

* cited by examiner

*Primary Examiner*—Thai Q. Tran
*Assistant Examiner*—Mishawn Dunn
(74) *Attorney, Agent, or Firm*—Cowan, Liebowitz & Latman, P.C.

(57) ABSTRACT

There is provided a signal processing apparatus that generates play list information for controlling the reproducing procedure carried out by reproducing means such that in recording a new information signal on a recording medium on which is previously recorded an information signal, the new information signal is reproduced in succession to reproduction of the previously recorded information signal up to a reproduction stop position, and upon completion of the reproduction of the new information signal, the previously recorded information signal is reproduced again from a position corresponding to the reproduction stop position thereof.

26 Claims, 6 Drawing Sheets

FIG. 3

| | BEFORE OVERWRITING | AFTER OVERWRITING |
|---|---|---|
| TRACK ADDRESS INFORMATION | A0~A1 = SCENE 1<br>A2~A3 = EMPTY AREA | A0~A1 = SCENE 1<br>A2~A3 = SCENE 2<br>A4~A3 = EMPTY AREA |
| PLAY LIST | NONE | A0~A1 → A2~A4 →<br>(DEPENDING ON META DATA) A1~ |

FIG. 6

| | |
|---|---|
| REPRODUCE SCENE 1 TO A1 | (1) |
| REPRODUCE SCENE 2 | (2) |
| REPRODUCE SCENE 1 FROM A5 | (3) |

SIGNAL PROCESSING APPARATUS

BACKGROUND OF THE INVENTION

1. Field of the Invention

This invention relates to a signal processing apparatus, and more particularly to processing of a play list that specifies an image signal reproducing procedure.

2. Description of the Related Art

Conventionally, there are known VTRs as equipment for recording image signals. If the VTR records a new image signal on a tape on which has already been recorded an image signal, the already recorded image signal is erased to record the new image signal. Thus, in reproducing the tape, an image based on the recorded new image signal is reproduced in succession to a part of a previously recorded image for which the image signal is not erased.

On the other hand, there have been recently developed apparatuses that record image data on disk media (hereinafter referred to as "disks") such as a magneto-optical disk and reproduce the same from the disks. Image signals are generally recorded and reproduced on a file-by-file basis on and from the disk media. Namely, even if an instruction for recording a new image signal on a disk is given at a time point when reproduction of a part of one file is completed, the new image signal is not recorded over the file having been reproduced as is the case with VTRS, but is recorded as a new file.

For this reason, these apparatuses using disk media utilize a play list technique in order to insert one file in an image signal of another file and reproduce the same. This play list is a file that is capable of freely specifying the procedure for reproducing information signals recorded on a disk. For example, the play list is capable of specifying the reproducing procedure such that "after reproduction of a file A from the top thereof for 10 seconds, a file B is reproduced from a position that is advanced from the top of the file B by 15 seconds". In this case, there is no necessity of processing original information signals of the files A and B.

By utilizing the play list technique as described above, it is possible to insert an image signal at a desired position and reproduced the same as in VTRs.

In VTRs, however, if a tape is edited such that a new scene is reproduced in succession to a previously recorded scene, the new scene must be overwritten on a trailing part of the previously recorded scene. Consequently, an already recorded image signal for the trailing part of the previously recorded scene is erased.

Further, when an image signal is inserted, to provide a space for recording the image signal, image signals for scenes before and after a position in which the image signal is to be inserted are once moved to another recording medium, and then the image signal to be inserted and the image signals for the scenes before and after the position are recorded onto the original recording medium. Moreover, when fade-in or fade-out is applied to a previously recorded scene, to provide a space for recording an image signal for a scene to be newly recorded, an image signal for the previously recorded scene and the image signal for the scene to be newly recorded are once moved to another recording medium, and then the image signal for the previously recorded scene and the image signal for the scene to be newly recorded are recorded onto the original recording medium such that the new scene is superimposed on the previously recorded scene.

Thus, to insert or cross-fade an image signal, it is necessary to carry out edition by once moving the relevant image signals to another recording medium and then again recording these image signals onto the original recording medium. It is therefore necessary to prepare two recording and reproducing apparatuses.

Further, even if an apparatus using a disk as a recording medium utilizes the play list technique, a play list must be edited after recording all information signals as materials. A user who is accustomed to recording by the VTR, however, cannot easily edit a play list after shooting.

SUMMARY OF THE INVENTION

It is therefore an object of the present invention to solve the above described problems.

It is another object of the present invention to provide a signal processing apparatus that enables reproduction of image signals without erasing a previously recorded image signal, so as to provide effects of overwrite recording, insert recording or special effect recording as conventionally employed without carrying out any of these recordings.

To attain the above objects, in a first aspect of the present invention, there is provided a signal processing apparatus that records a new information signal on a recording medium on which is previously recorded an information signal, comprising reproducing means for reproducing the information signals from the recording medium, stopping means for instructing the reproducing means to stop reproducing the information signals, signal processing instructing means for giving an instruction relating to predetermined signal processing, recording instructing means for giving an instruction for starting recording, recording means responsive to the instruction from the signal processing instructing means, for recording the new information signal on the recording medium and recording additional information indicating that the recorded new information signal is an information signal recorded in accordance with the instruction from the signal processing instructing means, together with a file including the new information signal on the recording medium, and play list processing means responsive to the instruction from the signal processing instructing means and the instruction for starting recording the new information signal on the recording medium from the recording instructing means, for generating play list information that controls a reproducing procedure carried out by the reproducing means such that the new information signal is reproduced in succession from a reproduction stop position of the previously recorded information signal.

Preferably, the recording means records the play list information generated by the play list processing means, on the recording medium.

In a preferred form of the present invention, the play list processing means is responsive to the instruction from the signal processing instructing means, for selecting a first reproducing procedure comprising reproducing the new information signal after reproduction of the previously recorded information signal up to a reproduction stop position of the previously recorded information signal, and then reproducing the previously recorded information signal again from a position different from the reproduction stop position, or a second reproducing procedure comprising reproducing the new information signal after reproduction of the previously recorded information signal up to the reproduction stop position, and then reproducing the previously recorded information signal again from the reproduction stop position.

In a typical preferred embodiment of the present invention, the information signals are image signals, and the play list processing means generates the play list information indicative of special effects to be applied to the previously recorded information signal and the new information signal at a boundary therebetween.

In a typical preferred embodiment of the present invention, the information signals are each in a form of one file, and the stopping means is capable of stopping reproduction of the information signal of the file at an intermediate portion thereof.

Preferably, the signal processing apparatus according to the present invention further comprises control means for controlling a reproducing operation of the reproducing means according to the play list information and the additional information reproduced from the recording medium by the reproducing means.

To attain the above object, in a second aspect of the present invention, there is provided a signal processing apparatus that records a new information signal on a recording medium on which is previously recorded an information signal, comprising reproducing means for reproducing the information signals from the recording medium, stopping means for instructing the reproducing means to stop reproducing the information signals, signal processing instructing means for giving an instruction relating to predetermined signal processing, recording instructing means for giving an instruction for starting recording, recording means for recording the new information signal on the recording medium, and play list processing means responsive to the instruction from the signal processing instructing means and the instruction for starting recording the new information signal on the recording medium from the recording instructing means, for generating play list information that controls a reproducing procedure carried out by the reproducing means such that the new information signal is reproduced in succession to reproduction of the previously recorded information signal up to a reproduction stop position, and upon completion of the reproduction of the new recorded information signal, the previously recorded information signal is reproduced from a position corresponding to the reproduction stop position of the previously recorded information signal.

To attain the above object, in a third aspect of the present invention, there is provided a signal processing apparatus that records a new information signal on a recording medium on which is previously recorded an information signal, comprising reproducing means for reproducing the information signals from the recording medium, stopping means for instructing the reproducing means to stop reproducing the information signals, signal processing instructing means for giving an instruction relating to predetermined signal processing, recording instructing means for giving an instruction for starting recording, recording means for recording the new information signal on the recording medium, and play list processing means responsive to the instruction from the signal processing instructing means and the instruction for starting recording the new information signal on the recording medium from the recording instructing means, for generating play list information that controls a reproducing procedure carried out by the reproducing means such that the new information signal is reproduced in succession to reproduction of the previously recorded information signal up to a reproduction stop position, and upon completion of the reproduction of the new recorded information signal, the previously recorded information signal is reproduced from a first position different from the reproduction stop position of the previously recorded information signal.

Preferably, in the third aspect of the present invention, the play list processing means determines the first position according to the reproduction stop position and a period of time required for reproducing the new information signal.

To attain the above object, in a fourth aspect of the present invention, there is provided a signal processing apparatus that records a new information signal on a recording medium on which is previously recorded an information signal, comprising reproducing means for reproducing the information signals from the recording medium, designating means for designating a desired switching position corresponding to an intermediate portion of the previously recorded information signal, signal processing instructing means for giving an instruction relating to predetermined signal processing, recording instructing means for giving an instruction for starting recording, recording means responsive to the instruction from the signal processing instructing means, for recording the new information signal on the recording medium and recording additional information indicating that the recorded new information signal is an information signal recorded in accordance with the instruction from the signal processing instructing means, together with a file including the new information signal on the recording medium, and play list processing means responsive to the instruction from the signal processing instructing means and the instruction for starting recording the new information signal on the recording medium from the recording instructing means, for generating play list information that controls a reproducing procedure carried out by the reproducing means such that the new information signal is reproduced in succession from the switching position designated for the previously recorded information signal.

To attain the above object, in a fifth aspect of the present invention, there is provided a signal processing apparatus that records a new information signal on a recording medium on which is previously recorded an information signal, comprising reproducing means for reproducing the information signals from the recording medium, designating means for designating a desired switching position corresponding to an intermediate portion of the previously recorded information signal, signal processing instructing means for giving an instruction relating to predetermined signal processing, recording instructing means for giving an instruction for starting recording, recording means for recording the new information signal on the recording medium, and play list processing means responsive to the instruction from the signal processing instructing means and the instruction for starting recording the new information signal on the recording medium from the recording instructing means, for generating play list information that controls a reproducing procedure carried out by the reproducing means such that the new information signal is reproduced in succession to reproduction of the previously recorded information signal up to the switching position, and upon completion of the reproduction of the new information signal, the previously recorded information signal is reproduced from a first position different from a position corresponding to the switching position designated for the previously recorded information signal.

To attain the above object, in a sixth aspect of the present invention, there is provided a signal processing apparatus that records a new information signal on a recording medium on which is previously recorded an information signal, comprising reproducing means for reproducing the information signals from the recording medium, designating means for designating a desired switching position corresponding to an intermediate portion of the previously recorded information signal, signal processing instructing means for giving an instruction relating to predetermined signal processing, recording instructing means for giving an instruction for starting recording, recording means for recording the new information signal on the recording medium, and play list processing meansresponsive to the instruction from the signal processing instructing means and the instruction for starting recording the new information signal on the recording medium from the recording instructing means, for generating play list information that controls a reproducing procedure carried out by the reproducing means such that the new information signal is reproduced in succession to reproduction of the previously recorded information signal up to the switching position, and upon completion of the reproduction of the new information signal, the previously recorded information signal is reproduced from a first position different from the switching position designated for the previously recorded information signal.

To attain the above object, in a seventh aspect of the present invention, there is provided a signal processing apparatus that records a new information signal on a recording medium on which is previously recorded an information signal, comprising recording means for recording the new information signal on the recording medium, overwrite reproduction instructing means for giving an instruction for carrying out overwrite reproduction of the new information signal, reproducing order information generating means responsive to the instruction from the overwrite reproduction instructing means, for generating reproducing order information indicative of a reproducing order in the overwrite reproduction, reproducing order information reading means for reading the reproducing order information generated by the reproducing order information generating means, reproducing means for reproducing the information signals from the recording medium, and control means for controlling the reproducing means such that the new information signal is overwritten on the previously recorded information signal according to the reproducing order information read by the reproducing order information reading means.

To attain the above object, in a eighth aspect of the present invention, there is provided a signal processing apparatus that records a new information signal on a recording medium on which is previously recorded an information signal, comprising recording means for recording the new information signal on the recording medium, insert reproduction instructing means for giving an instruction for carrying out insert reproduction of the new information signal, reproducing order information generating means responsive to the instruction from the insert reproduction instructing means, for generating reproducing order information indicative of a reproducing order in the insert reproduction, reproducing order information reading means for reading the reproducing order information generated by the reproducing order information generating means, reproducing means for reproducing the information signals from the recording medium, and control means for controlling the reproducing means such that the new information signal is inserted into the previously recorded information signal according to the reproducing order information read by the reproducing order information reading means.

The above and other objects, features, and advantages of the invention will become more apparent from the following detailed description taken in conjunction with the accompanying drawings.

BRIEF DESCRIPTION OF THE DRAWINGS

FIG. 3 is a diagram useful in explaining changes in information in the signal processing apparatus;

FIG. 6 is a diagram showing an example of a play list.

DETAILED DESCRIPTION OF THE PREFERRED EMBODIMENTS

The present invention will now be described in detail with reference to the accompanying drawings showing an embodiment thereof.

The gist of the present invention lies in that in recording information signals on a file-by-fail basis on a random access medium such as a disk medium, an information signal just before an area where a new information signal is desired to be superimposed is reproduced and the reproduction of the signal is then stopped, followed by starting recording the new signal. This enables a user to superimpose an information signal with the same feeling as in the case where he or she operates a VTR. Specifically, if a predetermined instruction, e.g. an instruction for carrying out superimpose recording is given prior to recording, a play list is automatically generated which specifies the reproducing procedure such that a newly recorded information signal is reproduced in succession to an information signal in an area of which reproduction has been stopped.

Figure 1:
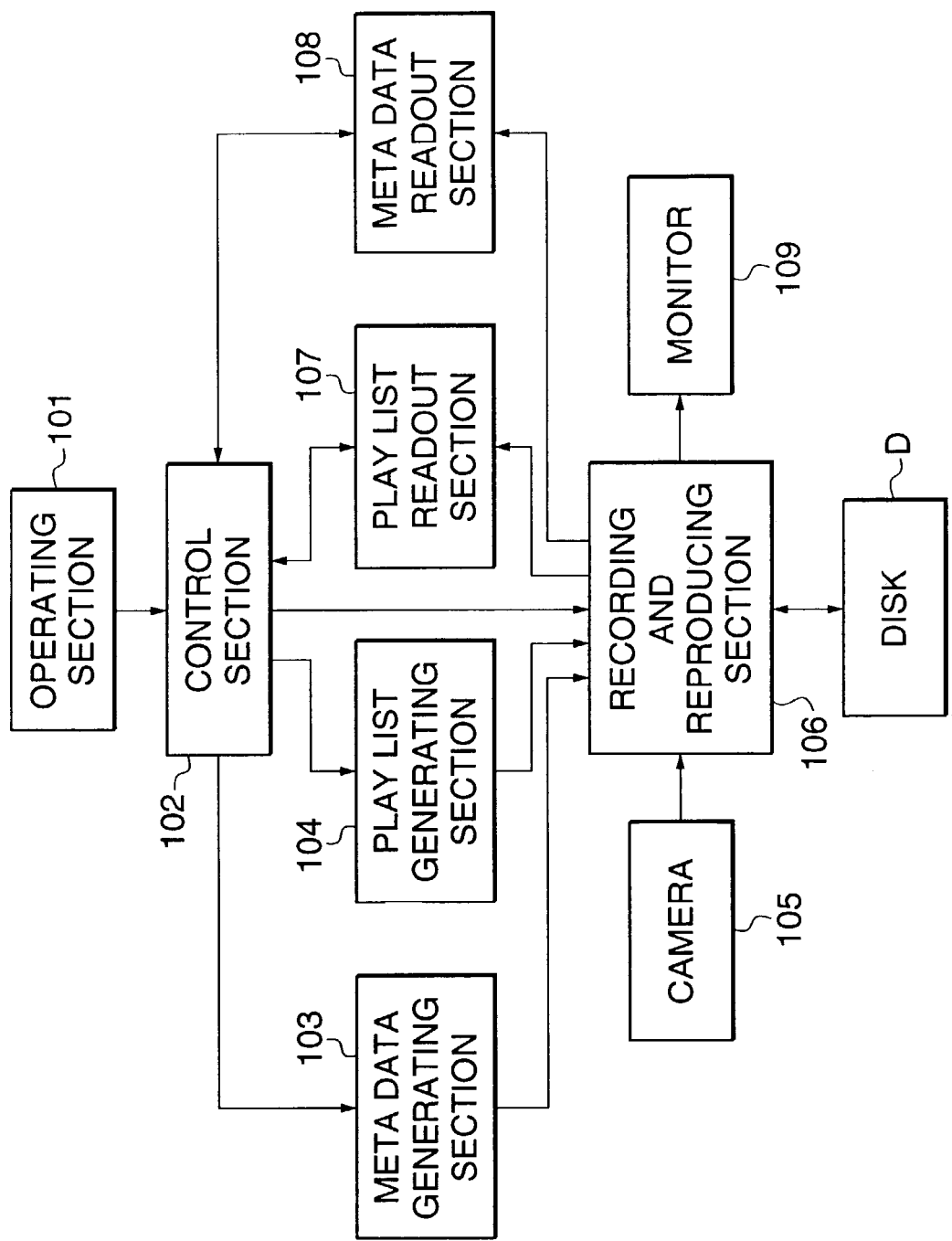
FIG. 1 is a block diagram showing the construction of a recording and reproducing apparatus as a signal processing apparatus according to an embodiment of the present invention.

FIG. 1 is a block diagram showing the construction of a recording and reproducing apparatus 100 as a signal processing apparatus according to an embodiment of the present invention. In FIG. 1, reference numeral 101 denotes an operating section; 102, a control section; 103, a meta data generating section; 104, a play list generating section; 105, a camera; 106, a recording and reproducing section; 107, a play list readout section; 108, a meta data readout section; and 109, an image monitor.

FIGS. 2A–2D, 4A–4D, and 5A–5D are diagrams showing the positional relationship and the temporal relationship between image data. FIG. 3 is a diagram useful in explaining a variety of information.

The recording and reproducing apparatus 100 according to the present embodiment provides a camera mode for shooting and recording, and a reproduction mode for mainly reproducing data from a disk. These two modes can be switched to each other by operating an operating section 101.

To perform normal shooting in the camera mode, the recording and reproducing section 106 operates in response to a control signal from the control 102, which has been instructed to start recording via the operating section 101, to code an image signal outputted from the camera 105 by a known coding method such as the MPEG2 method and record the coded signal on a disk D. Responsive to an instruction for stopping the recording, the recording and reproducing section 106 stops recording the signal on the disk D. On this occasion, a sequence of image signals outputted in a period of time after the instruction for starting the recording is given and until the instruction for stopping the recording is given is recorded as one file on the disk D.

On the other hand, in the reproduction mode, the recording and reproducing section 106 normally reproduces an image signal of a designated file from the disk D, decodes the image signal, and displays the resulting image on the monitor 109.

A description will now be given of an overwrite recording mode that constitutes one of characteristic operation modes of the present invention.

Figure 2A:
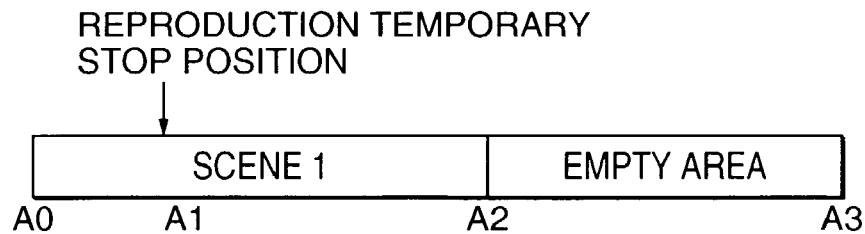
FIGS. 2A–2D are diagrams showing recorded images in the signal processing apparatus.

To enable the overwrite recording mode, a user gives an instruction for executing the overwrite recording mode via the operating section 101. Responsive to the instruction, the control section 102 displays information for asking the user to set an overwrite start position on the monitor 109 via the recording and reproducing section 106. This enables the recording and reproducing section 105 to reproduce image data from the disk D. The user then operates the operating section 101 to reproduce desired image data from the disk D, and checks the reproduced image on the monitor 108. The user then temporarily stops the reproduction at a desired start position A1 as shown in FIG. 2A. Upon lapse of a predetermined period of time after the temporary stop of the reproduction, the control section 102 provides control such that an image transmitted from the camera 105 is displayed on the monitor 109.

Figure 2B:

If the user gives an instruction for starting the recording in this state, the control section 102 controls the recording and reproducing section 106 to start recording the image transmitted from the camera 105 at a top address A2 of an empty space on the disk D as shown in FIG. 2B and controls the metal data generating section 103 to generate meta data indicating that "a scene 2 is a source for overwrite reproduction". This meta data is recorded at a footer of a file of the scene 2 at the end of the recording. With regard to a play list, the control section 102 controls the metal data generating section 103 to generate meta data (additional data) indicating that "this play list is a play list for overwrite reproduction". This meta data is recorded at a footer of a file of the play list.

Upon the start of the recording, the control section 102 controls the play list generating section 104 to generate play list items that specify the reproducing procedure such that the scene 2 is reproduced after reproduction of a file of a scene 1 on which the scene 2 is overwritten, from an address A0 to A1.

If the user gives an instruction for stopping the recording, the control section 102 controls the recording and reproducing section 106 to stop recording the image, and controls the play list generating section 104 to generate a play list item that specifies the reproducing procedure according to the first-mentioned meta data such that the scene 1 is reproduced from a predetermined address according to the meta data after reproduction of the scene 2 to the end. The recording and reproducing section 106 then records the generated play list items as a play list on the disk D. Consequently, three kinds of information, i.e. the image data, the play list, and the meta data are recorded on the disk D. The play list is recorded in a file that is independent from the image data files.

FIG. 3 shows changes in information before and after overwriting.

In FIG. 3, "track address information" is information that is recorded in a predetermined area of the disk D and represents the status of data recorded on the disk D. The track address information only includes information on the scene 1 and the empty area before overwriting, but includes additional address information on the scene 2 after overwriting. On the other hand, no play list is recorded before overwriting, but after overwriting, the play list is recorded which specifies the reproducing procedure comprising reproducing the scene 1 from the address A0 to A1, then reproducing the scene 2 from the address A2 to A4 according to the meta data, and then finally reproducing the rest of the scene 1.

Figure 2C:
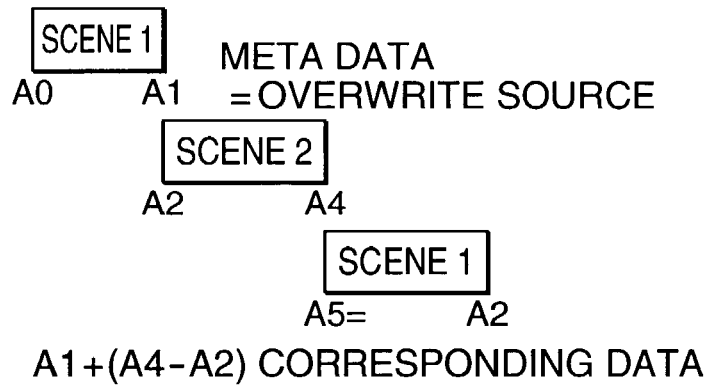

In reproduction, when the user gives an instruction for carrying out overwrite reproduction via the operating section 101, the control section 102 controls the recording and reproducing section 106 to reproduce the play list from the disk D. As shown in FIG. 2C, the play list readout section 107 then reads the play list items for overwrite reproduction from the disk D via the recording and reproducing section 106, and interprets the contents of the play list items to inform the control section 102 of the same. The control section 102 controls the recording and reproducing section 106 according to the reproducing procedure of the play list items such that after reproduction of the scene 1 from the address A0 to A1, the scene 2 is reproduced to the address A4.

The control section 102 also controls the meta data readout section 108 to check the meta data in each file designated by the play list. In this case, the scene 2 is indicated as "the source for overwrite reproduction" by the meta data, and therefore, according to the play list, after reproduction of the scene 2 to the address A4, the scene 1 is reproduced from an address A5, which is advanced from the address A1 by a period of time corresponding to a period of time required for reproducing the entire scene 2, to the end (address A2), to then stop the reproduction. Therefore, the image data is reproduced with the same effects as obtained by overwrite recording of image data as conventionally employed.

If a play list ignoring mode is selected in the reproduction mode via the operating section 101, the control section 102 controls the recording and reproducing section 106 such that the scene 1 and the scene 2 are sequentially reproduced in this order.

A description will now be given of operations in the case where an instruction for carrying out an insert reproduction mode that constitutes another characteristic operation mode of the present invention is given in recording.

Figure 4A:
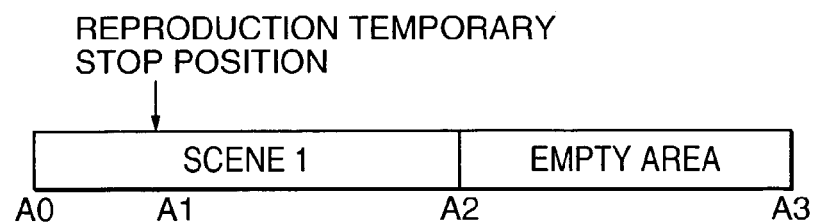
FIGS. 4A–4D are diagrams showing recorded images in the signal processing apparatus.
Figure 4B:
Figure 4C:
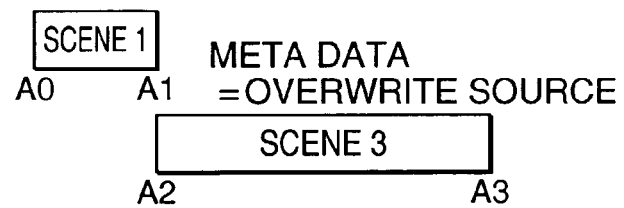

To carry out the insert reproduction, the user selects the insert reproduction mode via the operating section 101, and temporarily stops the reproduction at a desired edition start address A1 as shown in FIG. 4A. If the user then gives an instruction for starting recording, the recording and reproducing section 106 starts recording an image transmitted from the camera 105 from a top address A2 of an empty area on the disk D as shown in FIG. 4B, and the meta data generating section 103 generates meta data indicating that "a scene 3 is a source for insert reproduction".

Further, the play list generating section 104 generates play list items that specify the reproducing procedure such that the scene 3 is reproduced after reproduction of a scene 1 from an address A0 to A1. Further, the meta data generating section 103 generates meta data indicating that "this play list is a play list for insert reproduction".

If the user gives an instruction for stopping the recording, the recording and reproducing section 106 stops recording the image, and the play list generating section 104 generates a play list item that specifies the reproducing procedure such that after the reproduction of the scene 3, the reproduction of the scene 1 is started again from an address corresponding to the temporary stop position. The recording and reproducing section 106 records the generated play list items as a play list on the disk D. Therefore, three kinds of information, i.e. the image data, the play list, and the meta data are recorded on the disk D. The meta data are recorded at respective footers of a file of the image data to be newly recorded and a file of the play list.

Figure 4D:
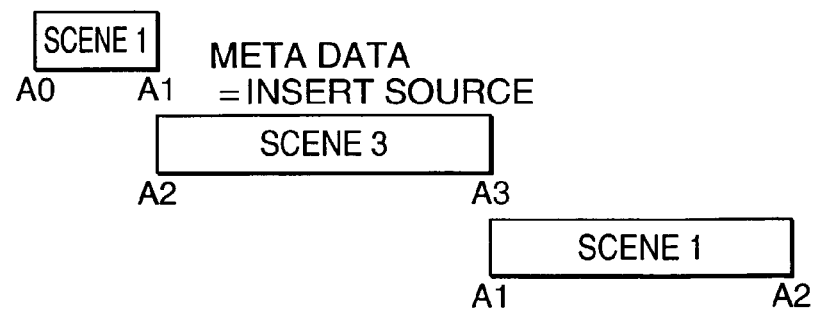

In reproduction, when the user gives an instruction for carrying out the insert reproduction, the play list readout section 107 reproduces the play list from the disk D via the recording and reproducing section 106 according to an instruction from the control section 102, and interprets the contents of the play list. The control section 102 controls the recording and reproducing section 106 according to the contents of the play list, such that the reproduction of the scene 3 is started from the top thereof to an address A3 after the reproduction of the scene 1 from the address A0 to A1 as shown in FIG. 4D.

In the case where the scene 3 is indicated as "the source for insert reproduction" by the meta data and the play list specifies the reproducing procedure such that the reproduction of the scene 1 is started again from the address A1 after the reproduction of the scene 3, the scene 1 is reproduced again from the address A1 to the end (address A2) after the reproduction of the scene 3, to then stop the reproduction. Therefore, the image data is reproduced with the same effects as obtained by insert recording of image data with a space being provided for insertion of the image data as conventionally employed.

Incidentally, if the scene 3 is recorded in the overwrite recording mode as in the above described example, the meta data readout section 108 detects that the scene 3 is indicated as "the source for overwrite reproduction" by the meta data. In this case, the total period of time required for reproducing the scene 1 from the address A0 to A1 and the entire scene 3 is found, and this total period of time is compared with a period of time required for reproducing the entire scene 1. In the example shown in FIG. 4, the total period of time required for reproducing the scene 1 from the address A0 to A1 and the entire scene 3 is longer than the period of time required for reproducing the entire scene 1, and therefore, the reproduction is stopped after the reproduction of the scene 3. Therefore, the mage data is reproduced with the same effects as obtained by overwrite recording of image data as conventionally employed.

If the play list ignoring mode is selected, the scene 1 and the scene 3 are sequentially reproduced from the beginning.

Figure 2D:
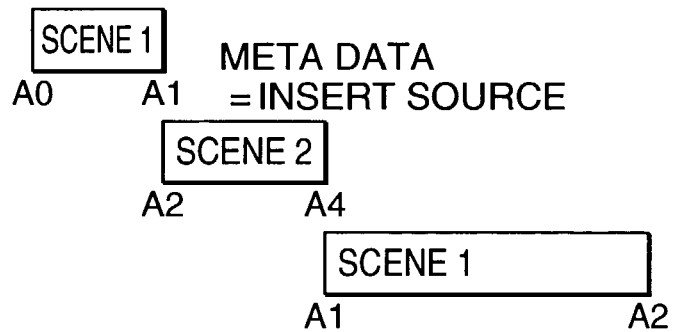

Referring again to FIGS. 2A to 2D, in the case where the scene 2 is recorded in the insert reproduction mode as shown in FIG. 2D, the meta data indicates that the "a scene 2 is a source for insert reproduction" and the play list specifies the reproducing procedure such that after the reproduction of the scene 2 up to the address A4, the scene 1 is reproduced again from the address A1 to the end (address A2) to then stop the reproduction. By reproducing the scenes according to the meta data and the play list as shown in FIG. 2D, the image data is reproduced with the same effects as obtained by insert recording of image data with a space being provided for insertion of the image data as conventionally employed.

Figure 5A:
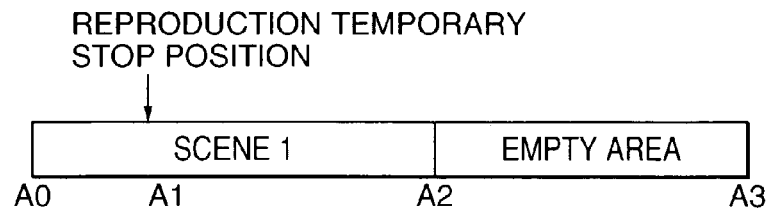
FIGS. 5A–5D are diagrams showing recorded images in the signal processing apparatus.

Further, as another operation mode characteristic of the present invention, if the play list is desired to be edited to reproduce image data so as to obtain the same effects as obtained by overwrite recording of image data as conventionally employed and a switching section between scenes is desired to be cross-faded, the reproduction is temporarily stopped at a desired edition start position address A1 as shown in FIG. 5A. The user selects the overwrite recording mode and a cross-fade mode via the operating section 101.

Figure 5B:
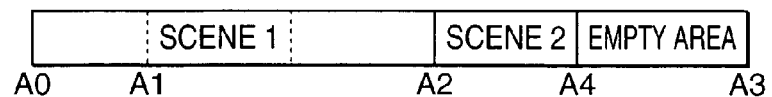

If the user then gives an instruction for starting recording, the recording and reproducing section 106 records an image transmitted from the camera 105 from a top address A2 of an empty area on the disk D, and the meta data generating section 103 generates meta data indicating that "a scene 2 is a source for insert reproduction" and "a source for cross-fade reproduction" as shown in FIG. 5B.

Further, the play list generating section 104 generates play list items that control the reproducing procedure such that the scene 2 is reproduced after reproduction of a scene 1 from an address A0 to A1. If the user gives an instruction for stopping the recording, the recording and reproducing section 106 stops recording the image, and the play list generating section 104 generates a play list item that specifies the reproducing procedure such that after reproduction of the scene 3, the reproduction of the scene 1 is started again from a predetermined address. The recording and reproducing section 106 adds the meta data to the image data and records them on the disk D, and records a file of the play list on the disk D. Thus, three kinds of information, i.e. the image data, the play list, and the meta data are recorded on the disk D.

Figure 5C:
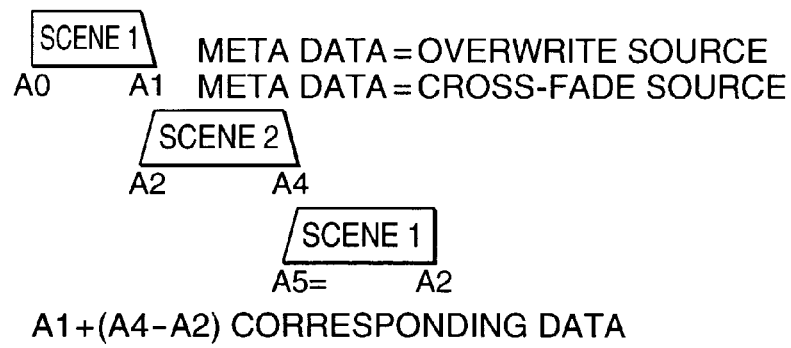

In reproduction, the play list readout section 107 reproduces the play list from the disk D via the recording and reproducing section 106, and interprets the contents of the play list and informs the control section 102 of the contents. The control section 102 controls the recording and reproducing section 106 according to the contents of the play list such that the scene 2 is reproduced up to an address A4 after reproduction of the scene 1 from the address A0 to A1 as shown in FIG. 5C. The meta data readout section 108 checks the meta data on the scene 2. Since the meta data indicates that the scene 2 is "the source for cross-fade reproduction", the control section 102 controls the recording and reproducing section 106 such that a switching section between the scene 1 and the scene 2 is faded-in or faded-out according to the meta data. Further, since the meta data indicates that the scene 2 is "the source for overwrite reproduction", the scene 1 is reproduced to the end (address A2) from an address A5, which is advanced from the address A1 by a period of time corresponding a period of time required for reproducing the scene 2. Therefore, the image data is reproduced with the same effects as obtained by overwrite recording of image data while fading-in or fading-out as conventionally employed.

If the play list ignoring mode is selected, the scene 1 and the scene 2 are sequentially reproduced from the beginning.

Figure 5D:
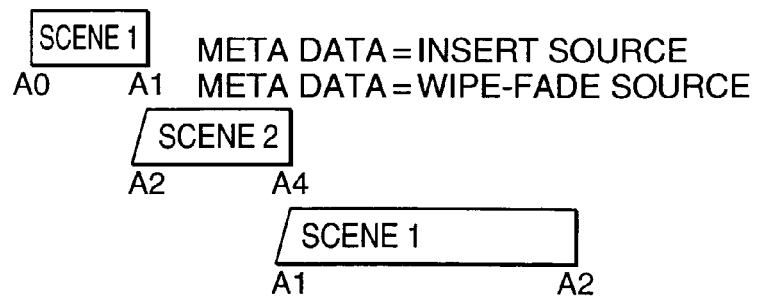

Further, in the case where the meta data indicates that "a scene 2 is a source for insert reproduction" and "a scene 2 is a source for wipe-fade reproduction" as shown in FIG. 5D, the switching section between the scene 1 and the scene 2 is wiped-in or wiped-out, and after the reproduction of the scene 2, the scene 1 is reproduced again from an address A1 to the end (address A2). Therefore, the image data is reproduced with the same effects as obtained by insert recording with a space being provided for insertion of image data while wiping-in and wiping-out as conventionally employed.

As described hereinabove, according to the present embodiment, a play list that specifies the reproducing procedure such that image data is reproduced in the overwrite recording mode selected in advance is generated in recording, and meta data is generated which indicates that a scene is a source for reproduction by overwriting in terms of time base. This enables reproduction of the image data with the same effects as obtained by overwrite recording even though overwrite recording is not physically carried out.

Further, a play list that specifies the reproducing procedure such that image data is reproduced in the insert reproduction mode selected in advance is generated in recording, and meta data is generated which indicates that a scene is a source for reproduction by insertion in terms of time base. This enables reproduction of the image data with the same effects as obtained by insertion of image data even though insertion is not physically carried out.

Further, a play list that specifies the reproducing procedure such that image data is reproduced in the effect reproduction mode selected in advance is generated in recording, and meta data is generated which indicates that a scene is a source for reproduction with special effects in terms of time base. This enables reproduction of the image data with the same effects as obtained by reproduction with special effects even though reproduction with special effects is not carried out during recording.

Although in the above described embodiment, if image data is recorded in the overwrite recording mode, the play list in FIG. 2, for example, only specifies the reproducing procedure such that the scene 2 is reproduced from the address A2 to A4 after the reproduction of the scene 1 from the address A0 to A1, and the control section 102 controls the procedure for reproducing the scene 1 again from the address A5 after the reproduction of the scene 2 according to the meta data on the scene 2, all of such procedures, however, may be specified by the play list.

Specifically, at a time point when the recording of the scene 2 is stopped, the total period of time required for reproducing the scene 1 from the address A0 to A1 and the entire scene 2 is compared with a period of time required for reproducing the entire scene 1. In the case of the example shown in FIG. 2, the period of time required for reproducing the entire scene 1 is longer than the total period of time required for reproducing the scene 1 from the address A0 to A1 and the entire scene 2, a play list is generated which specifies the reproducing procedure such that after reproduction of the scene 2, the scene 1 is reproduced again from the address A5. This play list is illustrated in FIG. 6. In FIG. 6, the play list is comprised of descriptions in three lines (1) to (3).

If the descriptions are written in the play list as shown in FIG. 6, there is no necessity of checking meta data during reproduction in order to calculate an address at which reproduction is started after the reproduction of the scene 2.

On the other hand, in the case where the total period of time required for reproducing the scene 1 from the address A0 to A1 and the entire scene 3 as the overwrite reproduction source is longer than the period of time required for reproducing the entire scene 1, a play list is generated which specifies the reproducing procedure such that the reproduction is stopped immediately after reproduction of the scene 3.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the storage medium on which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing a program code read out by a computer, but also by causing an OS (Operating System) or the like which operates on the computer to perform a part or all of the actual operations based on instructions of the program code.

Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A signal processing apparatus that records a new information signal on a recording medium on which is previously recorded an information signal, comprising:

reproducing means for reproducing the information signals from the recording medium;

stop instructing means for giving an instruction to stop reproducing the previously recorded information signal at an arbitrary position in the previously recorded information signal;

signal processing instructing means for giving an instruction relating to predetermined signal processing;

recording instructing means for giving an instruction for starting recording;

recording means responsive to the instruction from said signal processing instructing means and the instruction for starting recording the new information signal from said recording instructing means, for recording the new information signal into an empty space on the recording medium and recording additional information indicating that the recorded new information signal is an information signal recorded in accordance with the instruction from said signal processing instructing means, together with a file including the new information signal on the recording medium; and play list processing means responsive to the instruction from said signal processing instructing means and the instruction for starting recording the new information signal on the recording medium from said recording instructing means, for generating play list information that controls a reproducing procedure carried out by said reproducing means such that the new information signal is reproduced in succession to reproduction of the previously recorded information signal up to a reproduction stop position instructed by said stop instructing means.

2. A signal processing apparatus according to claim 1, wherein said recording means records the play list information generated by said play list processing means, on the recording medium.

3. A signal processing apparatus according to claim 1, wherein said play list processing means is responsive to the instruction from said signal processing instructing means, for selecting a first reproducing procedure comprising reproducing the new information signal after reproduction of the previously recorded information signal up to a reproduction stop position of the previously recorded information signal, and then reproducing the previously recorded information signal again from a position different from the reproduction stop position, or a second reproducing procedure comprising reproducing the new information signal after reproduction of the previously recorded information signal up to the reproduction stop position, and then reproducing the previously recorded information signal again from the reproduction stop position.

4. A signal processing apparatus according to claim 1, wherein the information signals are image signals, and said play list processing means generates the play list information indicative of special effects to be applied to the previously recorded information signal and the new information signal at a boundary therebetween.

5. A signal processing apparatus according to claim 1, wherein the information signals are each in a form of one file, and said stop instructing means is capable of instructing to stop reproduction of the information signal of the file at an intermediate portion thereof.

6. A signal processing apparatus according to claim 1, further comprising control means for controlling a reproducing operation of said reproducing means according to the play list information and the additional information reproduced from the recording medium by said reproducing means.

7. A signal processing apparatus that records a new information signal on a recording medium on which is previously recorded an information signal, comprising:
  reproducing means for reproducing the information signals from the recording medium;
  stop instructing means for giving an instruction to stop reproducing the information signals at an arbitrary position in the information signals;
  signal processing instructing means for giving an instruction relating to predetermined signal processing;
  recording instructing means for giving an instruction for starting recording;
  recording means responsive to the instruction for starting recording the new information signal from said recording instructing means, for recording the new information signal into an empty space on the recording medium; and
  play list processing means responsive to the instruction from said signal processing instructing means and the instruction for starting recording the new information signal on the recording medium from said recording instructing means, for generating play list information that controls a reproducing procedure carried out by said reproducing means such that the new information signal is reproduced in succession to reproduction of the previously recorded information signal up to a reproduction stop position instructed by said stop instructing means, and upon completion of the reproduction of the new recorded information signal, the previously recorded information signal is reproduced from a position corresponding to the reproduction stop position of the previously recorded information signal.

8. A signal processing apparatus according to claim 7, wherein said recording means records the play list information generated by said play list processing means, on the recording medium.

9. A signal processing apparatus according to claim 7, wherein the information signals are image signals, and said play list processing means generates the play list information indicative of special effects to be applied to the previously recorded information signal and the new information signal at a boundary therebetween.

10. A signal processing apparatus according to claim 7, wherein the information signals are each in a form of one file, and said stop instructing means is capable of instructing to stop reproduction of the information signal of the file at an intermediate portion thereof.

11. A signal processing apparatus according to claim 7, further comprising control means for controlling reproduction of said reproducing means according to the play list information.

12. A signal processing apparatus that records a new information signal on a recording medium on which is previously recorded an information signal, comprising:
  reproducing means for reproducing the information signals from the recording medium;
  stop instructing means for giving an instruction to stop reproducing the previously recorded information signal at an arbitrary position in the previously recorded information signal;
  signal processing instructing means for giving an instruction relating to predetermined signal processing;
  recording instructing means for giving an instruction for starting recording;
  recording means responsive to the instruction from said signal processing instructing means and the instruction for starting recording the new information signal from said recording instructing means, for recording the new information signal into an empty space on the recording medium and recording additional information indicating that the recorded new information signal is an information signal recorded in accordance with the instruction from said signal processing instructing means, together with a file including the new information signal on the recording medium; and
  play list processing means responsive to the instruction from said signal processing instructing means and the instruction for starting recording the new information signal on the recording medium from said recording instructing means, for generating play list information that controls a reproducing procedure carried out by said reproducing means such that the new information signal is reproduced in succession to reproduction of the previously recorded information signal up to a reproduction stop position instructed by said stop instructing means, and upon completion of the reproduction of the new recorded information signal, the previously recorded information signal is reproduced from a first position different from the reproduction stop position of the previously recorded information signal.

13. A signal processing apparatus according to claim 12, wherein said play list processing means determines the first position according to the reproduction stop position and a period of time required for reproducing the new information signal.

14. A signal processing apparatus according to claim 12, wherein said recording means records the play list information generated by said play list processing means, on the recording medium.

15. A signal processing apparatus according to claim 12, wherein the information signals are image signals, and said play list processing means generates the play list information indicative of special effects to be applied to the previously recorded information signal and the new information signal at a boundary therebetween.

16. A signal processing apparatus according to claim 13, wherein the information signals are each in a form of one file, and said stop instructing means is capable of instructing to stop reproduction of the information signal of the file at an intermediate portion thereof.

17. A signal processing apparatus according to claim 14, further comprising control means for controlling reproduction of said reproducing means according to the play list information.

18. A signal processing apparatus that records a new information signal on a recording medium on which is previously recorded an information signal, comprising:
reproducing means for reproducing the information signals from the recording medium;
designating means for designating a desired switching position in the previously recorded information signal;
signal processing instructing means for giving an instruction relating to predetermined signal processing;
recording instructing means for giving an instruction for starting recording;
recording means responsive to the instruction from said signal processing instructing means and the instruction for starting recording the new information signal from said recording instructing means, for recording the new information signal into an empty space on the recording medium and recording additional information indicating that the recorded new information signal is an information signal recorded in accordance with the instruction from said signal processing instructing means, together with a file including the new information signal on the recording medium; and
play list processing means responsive to the instruction from said signal processing instructing means and the instruction for starting recording the new information signal on the recording medium from said recording instructing means, for generating play list information that controls a reproducing procedure carried out by said reproducing means such that the new information signal is reproduced in succession to reproduction of the previously recorded information signal up to the switching position designated by said designating means.

19. A signal processing apparatus according to claim 18, wherein the information signals are each in a form of one file, and said designating means is capable of designating the switching position corresponding to an intermediate portion of the information signal of the file.

20. A signal processing apparatus that records a new information signal on a recording medium on which is previously recorded an information signal, comprising:
reproducing means for reproducing the information signals from the recording medium;
designating means for designating a desired switching position in the previously recorded information signal;
signal processing instructing means for giving an instruction relating to predetermined signal processing;
recording instructing means for giving an instruction for starting recording;
recording means responsive to the instruction from said signal processing instructing means and the instruction for starting recording the new information signal from said recording instructing means, for recording the new information signal into an empty space on the recording medium and recording additional information indicating that the recorded new information signal is an information signal recorded in accordance with the instruction from said signal processing instructing means, together with a file including the new information signal on the recording medium; and
play list processing means responsive to the instruction from said signal processing instructing means and the instruction for starting recording the new information signal on the recording medium from said recording instructing means, for generating play list information that controls a reproducing procedure carried out by said reproducing means such that the new information signal is reproduced in succession to reproduction of the previously recorded information signal up to the switching position designated by said designating means, and upon completion of the reproduction of the new information signal, the previously recorded information signal is reproduced from a first position different from a position corresponding to the switching position designated for the previously recorded information signal.

21. A signal processing apparatus according to claim 20, wherein the information signals are each in a form of one file, and said designating means is capable of designating the switching position corresponding to an intermediate portion of the information signal of the file.

22. A signal processing apparatus that records a new information signal on a recording medium on which is previously recorded an information signal, comprising:
reproducing means for reproducing the information signals from the recording medium;
designating means for designating a desired switching position in the previously recorded information signal;
signal processing instructing means for giving an instruction relating to predetermined signal processing;
recording instructing means for giving an instruction for starting recording;
recording means responsive to the instruction from said signal processing instructing means and the instruction for starting recording the new information signal from said recording instructing means, for recording the new information signal into an empty space on the recording medium and recording additional information indicating that the recorded new information signal is an information signal recorded in accordance with the instruction from said signal processing instructing means, together with a file including the new information signal on the recording medium; and
play list processing means responsive to the instruction from said signal processing instructing means and the instruction for starting recording the new information signal on the recording medium from said recording instructing means, for generating play list information that controls a reproducing procedure carried out by said reproducing means such that the new information signal is reproduced in succession to reproduction of the previously recorded information signal up to the switching position designated by said designating means, and upon completion of the reproduction of the new information signal, the previously recorded information signal is reproduced from a first position different from the switching position designated for the previously recorded information signal.

23. A signal processing apparatus according to claim 22, wherein the information signals are each in a form of one file, and said designating means is capable of designating the switching position corresponding to an intermediate portion of the information signal of the file.

24. A signal processing apparatus according to claim 22, wherein said play list processing means determines the first position according to the reproduction stop position and a period of time required for reproducing the new information signal.

25. A signal processing apparatus that records a new information signal on a recording medium on which is previously recorded an information signal, comprising:

recording means for recording the new information signal into an empty space on the recording medium;

overwrite reproduction instructing means for giving an instruction for carrying out overwrite reproduction processing for reproducing the new information signal in succession to reproduction to a midpoint of the previously recorded information signal;

reproducing order information generating means responsive to the instruction from said overwrite reproduction instructing means, for generating reproducing order information indicative of a reproducing order in the overwrite reproduction processing;

reproducing order information reading means for reading the reproducing order information generated by said reproducing order information generating means;

reproducing means for reproducing the information signals from the recording medium; and control means for controlling said reproducing means such that the new information signal is reproduced in succession to reproduction to a midpoint of the previously recorded information signal according to the reproducing order information read by said reproducing order information reading means.

26. A signal processing apparatus that records a new information signal on a recording medium on which is previously recorded an information signal, comprising:

recording means for recording the new information signal into an empty space on the recording medium;

insert reproduction instructing means for giving an instruction for carrying out insert reproduction processing for reproducing the new information signal instead of the previously recorded information signal during reproduction of the previously recorded information signal, and for again reproducing the previously recorded information signal instead of the new information signal;

reproducing order information generating means responsive to the instruction from said insert reproduction instructing means, for generating reproducing order information indicative of a reproducing order in the insert reproduction processing;

reproducing order information reading means for reading the reproducing order information generated by said reproducing order information generating means;

reproducing means for reproducing the information signals from the recording medium; and control means for controlling said reproducing means such that the new information signal is reproduced instead of the previously recorded information signal during reproduction of the previously recorded information signal, and for again reproducing the previously recorded information signal instead of the previously recorded information signal according to the reproducing order information read by said reproducing order information reading means.

* * * * *